US00RE41504E

(19) United States
(12) Reissued Patent
Maziasz et al.

(10) Patent Number: US RE41,504 E
(45) Date of Reissued Patent: Aug. 17, 2010

(54) HEAT AND CORROSION RESISTANT CAST CF8C STAINLESS STEEL WITH IMPROVED HIGH TEMPERATURE STRENGTH AND DUCTILITY

(75) Inventors: Philip J. Maziasz, Oak Ridge, TN (US); Tim McGreevy, Washington, IL (US); Michael James Pollard, Peoria, IL (US); Chad W. Siebenaler, Dunlap, IL (US); Robert W. Swindeman, Oak Ridge, TN (US)

(73) Assignee: Caterpillar Inc., Peoria, IL (US)

(21) Appl. No.: 12/230,179

(22) Filed: Aug. 25, 2008

Related U.S. Patent Documents

Reissue of:
(64) Patent No.: 7,153,373
Issued: Dec. 26, 2006
Appl. No.: 10/195,724
Filed: Jul. 15, 2002

U.S. Applications:

(63) Continuation of application No. 09/736,741, filed on Dec. 14, 2000, now abandoned.

(51) Int. Cl.
*C22C 38/58* (2006.01)

(52) U.S. Cl. ..... 148/327; 420/44; 420/45; 420/46

(58) Field of Classification Search ..... 148/327
See application file for complete search history.

(56) References Cited

U.S. PATENT DOCUMENTS

| | | | |
|---|---|---|---|
| 2,602,738 | A | 7/1952 | Jennings |
| 2,671,726 | A | 3/1954 | Jennings |
| 2,696,433 | A | 12/1954 | Tanczyn |
| 2,892,703 | A | 6/1959 | Furman et al. |
| 4,299,623 | A | 11/1981 | Azbukin et al. |
| 4,341,555 | A | 7/1982 | Douthett et al. |
| 4,450,008 | A | 5/1984 | Andreini et al. |
| 4,560,408 | A | 12/1985 | Wilhelmsson |
| 4,675,156 | A | 6/1987 | Sakamoto et al. |
| 5,064,610 | A | 11/1991 | Sato et al. |
| 5,147,475 | A | 9/1992 | Holmberg |
| 5,340,534 | A | 8/1994 | Magee |
| 5,525,167 | A | 6/1996 | McVicker |
| 5,536,335 | A | 7/1996 | Burris |
| 5,595,614 | A | 1/1997 | McVicker |
| 5,824,264 | A | 10/1998 | Uno et al. |
| 5,910,223 | A | 6/1999 | Tipton et al. |
| 6,033,626 | A | 3/2000 | Takahashi |

FOREIGN PATENT DOCUMENTS

| | | |
|---|---|---|
| CH | 313006 | 3/1956 |
| EP | 0296439 | 12/1988 |
| EP | 0340631 A1 | 11/1989 |
| EP | 0467756 A1 | 1/1992 |
| EP | 0668367 A1 | 8/1995 |
| GB | 1061511 | 3/1967 |
| GB | 1413935 | 11/1975 |

OTHER PUBLICATIONS

Davis, J.R., "High–Alloy Cast Steels," ASM Specialty Handbook (Heat–Resistant Materials) (1997), pp. 200–202.
Davis, J.R. "Metallurgy and Properties of Cast Stainless Steels," ASM Specialty Handbook (Stainless Steels) 1994, pp. 66–88.
Chen et al., "Development of the 6.8L V10 Heat Resisting Cast–Steel Exhaust Manifold," SAW Technical Paper Series (Oct. 14–16, 1996), pp. 57–64.
Search report from EPO for corresponding Application No. EP01124942 dated Feb. 27, 2003 (3 pages).

*Primary Examiner*—Roy King
*Assistant Examiner*—Jie Yang
(74) *Attorney, Agent, or Firm*—Finnegan, Henderson, Farabow, Garrett & Dunner

(57) ABSTRACT

A CF8C type stainless steel alloy and articles formed therefrom containing about 18.0 weight percent to about 22.0 weight percent chromium and 11.0 weight percent to about 14.0 weight percent nickel; from about 0.05 weight percent to about 0.15 weight percent carbon; from about 2.0 weight percent to about 10.0 weight percent manganese; and from about 0.3 weight percent to about 1.5 weight percent niobium. The present alloys further include less than 0.15 weight percent sulfur which provides high temperature strength both in the matrix and at the grain boundaries without reducing ductility due to cracking along boundaries with continuous or nearly-continuous carbides. The disclosed alloys also have increased nitrogen solubility thereby enhancing strength at all temperatures because nitride precipitates or nitrogen porosity during casting are not observed. The solubility of nitrogen is dramatically enhanced by the presence of manganese, which also retains or improves the solubility of carbon thereby providing additional solid solution strengthening due to the presence of manganese and nitrogen, and combined carbon.

22 Claims, No Drawings

HEAT AND CORROSION RESISTANT CAST CF8C STAINLESS STEEL WITH IMPROVED HIGH TEMPERATURE STRENGTH AND DUCTILITY

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation of U.S. patent application Ser. No. 09/736,741 filed Dec. 14, 2000 now abandoned, the disclosure of which is incorporated by reference herein.

This invention was made with U.S. Government support under U.S. Department of Energy Contract No.: DE-AC05-960R2264 awarded by the U.S. Department of Energy. The U.S. Government has certain rights in this invention.

TECHNICAL FIELD

This invention relates generally to cast steel alloys of the CF8C type with improved strength and ductility at high temperatures. More particularly, this invention relates to CF8C type stainless steel alloys and articles made therefrom having excellent high temperature strength, creep resistance and aging resistance, with reduced niobium carbides, manganese sulfides, and chrome carbides along grain and substructure boundaries.

BACKGROUND

There is a need for high strength, oxidation resistant and crack resistant cast alloys for use in internal combustion engine components such as exhaust manifolds and turbocharger housings and gas-turbine engine components such as combustor housings as well as other components that must function in extreme environments for prolonged periods of time. The need for improved high strength, oxidation resistant, crack resistant cast alloys arises from the desire to increase operating temperatures of diesel engines, gasoline engines, and gas-turbine engines in effort of increasing fuel efficiency and the desire to increase the warranted operating hours or miles for diesel engines, gasoline engines and gas-turbine engines.

Current materials used for applications such as exhaust manifolds, turbo-charger housings and combustor housings are limited by oxidation and corrosion resistance as well as by strength at high temperatures and detrimental effects of aging. Specifically, current exhaust manifold materials, such as high silicon and molybdenum cast ductile iron (Hi—Si—Mo) and austenitic ductile iron (Ni-resist) must be replaced by cast stainless steels when used for more severe applications such as higher operating temperatures or when longer operating lifetimes are demanded due to increased warranty coverage. The currently commercially available cast stainless steels include ferritic stainless steels such as NHSR-F5N or austenitic stainless steels such as NHSR-A3N, CF8C and CN-12. However, these currently-available cast stainless steels are deficient in terms of tensile and creep strength at temperatures exceeding 600° C., do not provide adequate cyclic oxidation resistance for temperatures exceeding 700° C., do not provide sufficient room temperature ductility either as-cast or after service exposure and aging, do not have the requisite long-term stability of the original microstructure and lack long-term resistance to cracking during severe thermal cycling.

Currently-available cast austenitic stainless CF8C steels include from 18 wt. % to 21 wt. % chromium, 9 wt. % to 12 wt. % nickel and smaller amounts of carbon, silicon, manganese, phosphorous, sulfur and niobium. CF8C typically includes about 2 wt. % silicon, about 1.5 wt. % manganese and about 0.04 wt. % sulfur. CF8C is a niobium stabilized grade of austenitic stainless steel most suitable for aqueous corrosion resistance at temperatures below 500° C. In the standard form CF8C has inferior strength compared to CN12 at temperatures about 600° C.

It is therefore desirable to have a CF8C type steel alloy and articles made from a steel alloy that have improved strength at high temperatures and improved ductility for engine component applications requiring severe thermal cycling, high operation temperatures and extended warranty coverage.

SUMMARY OF THE INVENTION

The present invention may be characterized as a heat resistant and cast, corrosion resistant austenitic stainless steel alloy. In particular, the heat resistant and cast, corrosion resistant austenitic stainless steel alloy comprises from about 0.05 weight percent to about 0.15 weight percent carbon, from about 2.0 weight percent to about 10 weight percent manganese; and less than about 0.03 weight percent sulfur.

In another aspect, the invention also be characterized as a heat resistant and cast, corrosion resistant austenitic stainless steel alloy comprising from about 18.0 weight percent to about 22.0 weight percent chromium and 11.0 weight percent to about 14.0 weight percent nickel, from about 0.05 weight percent to about 0.15 weight percent carbon, from about 2.0 weight percent to about 10.0 weight percent manganese, and from about 0.3 weight percent to about 1.5 weight percent niobium.

Various advantages of the present invention will become apparent upon reading the following detailed description and appended claims.

DETAILED DESCRIPTION

The present invention is directed toward steel alloys of the CF8C type. Table 1 presents the optimal and permissible minimum and maximum ranges for the compositional elements of CF8C stainless steel alloys made in accordance with the present invention. Boron, aluminum and copper also may be added. However, it will be noted that allowable ranges for cobalt, vanadium, tungsten and titanium may not significantly alter the performance of the resulting material. Specifically, based on current information, that cobalt may range from 0 to 5 wt. %, vanadium may range from 0 to 3 wt. %, tungsten may range from 0 to 3 wt. % and titanium may range from 0 to 0.2 wt. % without significantly altering the performances of the alloys. Accordingly, it is anticipated that the inclusion of these elements in amounts that fall outside of the ranges of Table 1 would still provide advantageous alloys and would fall within the spirit and scope of the present invention.

TABLE 1

| Modified CF8C | OPTIMAL | | PERMISSIBLE | |
|---|---|---|---|---|
| Element | MIN | MAX | MIN | MAX |
| Chromium | 18.0 | 21.0 | 18.0 | 25.0 |
| Nickel | 12.0 | 15.0 | 8.0 | 20.0 |
| Carbon | 0.07 | 0.1 | 0.05 | 0.15 |
| Silicon | 0.5 | 0.75 | 0.20 | 3.0 |
| Manganese | 2.0 | 5.0 | 0.5 | 10.0 |
| Phosphorous | 0 | 0.04 | 0 | 0.04 |
| Sulfur | 0 | 0.03 | 0 | 0.1 |
| Molybdenum | 0 | 0.5 | 0 | 1.0 |
| Copper | 0 | 0.3 | 0 | 3.0 |
| Niobium | 0.3 | 1.0 | 0 | 1.5 |
| Nitrogen | 0.1 | 0.3 | 0.02 | 0.5 |
| Titanium | 0 | 0.03 | 0 | 0.2 |
| Cobalt | 0 | 0.5 | 0 | 5.0 |
| Aluminum | 0 | 0.05 | 0 | 3.0 |
| Boron | 0 | 0.01 | 0 | 0.01 |
| Vanadium | 0 | 0.01 | 0 | 3.0 |
| Tungsten | 0 | 0.1 | 0 | 3.0 |
| Niobium:Carbon | 9 | 11 | 8 | 11 |
| Carbon + Nitrogen | 0.15 | 0.4 | 0.1 | 0.5 |

Unexpectedly, the inventors have found that substantially reducing the sulfur content of austenitic stainless steels increases the creep properties. The inventors believe machineability is not significantly altered as they believe the carbide morphology controls machining characteristics in this alloys system. While sulfur may be an important component of cast stainless steels for other applications because it contributes significantly to the machineability of such steels, it severely limits the high temperature creep-life and ductility and low temperature ductility after service at elevated temperatures.

The inventors have found that removing or substantially reducing the presence of sulfur alone provides a four-fold improvement in creep life at 850° C. at a stress load of 110 MPa.

Further, the inventors have found that reducing the maximum carbon content in the alloys of the present invention reduces the coarse NbC and possibly some of the coarse Cr23C6 constituents from the total carbide content. Table 2 includes the compositions of two experimental modified CF8C type alloys I and J in comparison with a standard CF8C alloy.

TABLE 2

| Element | STANDARD CF8C | I | J |
|---|---|---|---|
| Chromium | 19.16 | 19.14 | 19.08 |
| Nickel | 12.19 | 12.24 | 12.36 |
| Carbon | 0.08 | 0.09 | 0.08 |
| Silicon | 0.66 | 0.62 | 0.67 |
| Manganese | 1.89 | 1.80 | 4.55 |
| Phosphorous | 0.004 | 0.004 | 0.005 |
| Sulfur | 0.002 | 0.002 | 0.004 |
| Molybdenum | 0.31 | 0.31 | 0.31 |
| Copper | 0.01 | 0.01 | 0.01 |
| Niobium | 0.68 | 0.68 | 0.68 |
| Nitrogen | 0.02 | 0.11 | 0.23 |
| Titanium | 0.008 | 0.006 | 0.006 |
| Cobalt | 0.01 | 0.01 | 0.01 |
| Aluminum | 0.01 | 0.01 | 0.01 |
| Boron | 0.001 | 0.001 | 0.001 |
| Vanadium | 0.004 | 0.007 | 0.001 |

TABLE 2-continued

| Element | STANDARD CF8C | I | J |
|---|---|---|---|
| Niobium:Carbon | 8.40 | 7.82 | 8.52 |
| Carbon + Nitrogen | 0.10 | 0.20 | 0.31 |

The elevated tensile properties for alloys I, J, and CF8C were measured at 850° C. and are displayed in Table 3. Creep properties of alloys I, J, and CF8C were measured at 850° C. and are displayed in Table 4.

TABLE 3

| Alloy | Condition | Temp (° C.) | Strain Rate (l/sec) | YS (ksi) | UTS (ksi) | Elong (%) |
|---|---|---|---|---|---|---|
| CF8C | As-Cast | 850 | IE-05 | 11.7 | 12.6 | 31.2 |
| I | As-Cast | 850 | IE-05 | 17.1 | 18.1 | 45.9 |
| J | As-Cast | 850 | IE-05 | 21.5 | 22.1 | 35 |

TABLE 4

| Heat | Condition | Temp (° C.) | Stress (ksi) | Life (Hours) | Elong (%) |
|---|---|---|---|---|---|
| CF8C | As-Cast | 850 | 35 | 1824 | 7.2 |
| I | As-Cast | 850 | 35 | 5252* | 2 |
| J | As-Cast | 850 | 35 | 6045* | 0.4 |

The critical test conditions for the alloys in Table 4 (CF8C type alloys) of 850° C. and 35MPa were again chosen because of expected operating temperatures and the harmful precipitates, which form readily. The stress of 35MPa was chosen for accelerated test conditions that would again equate to much longer durability at lower stress levels during engine service. The increase in nitrogen results in a dramatic increase in room and elevated temperature strength and ductility with at least a three-fold improvements in creep life at 850° C.

A solution annealing treatment (SA) was applied to each alloy to analyze the effect of a more uniform distribution of carbon. The alloys were held at 1200° C. for one hour. They were then air cooled rather than quenched to allow the small niobium carbide and chromium carbide precipitates to nucleate in the matrix during cooling. The resulting microstructure was found to be very similar to the as-cast (AS) structure except for the formation of small precipitates.

Unfortunately, the solution annealing treatment lowered creep life significantly while increasing creep ductility, therefore proving that the strategy to optimize the as-cast microstructures was best as well as most cost effective.

Alloys I and J aged at 850° C. for 1000 hours showed improved strength compared to the commercially available CF8C.

TABLE 5

| Alloy | Condition | Temp (° C.) | Strain Rate (l/sec) | YS (ksi) | UTS (ksi) | Elong (%) |
|---|---|---|---|---|---|---|
| CF8C | Aged 1000 hr at 850° C. | 22 | IE-05 | 28.3 | 67.5 | 27 |
| I | Aged 1000 hr at 850° C. | 22 | IE-05 | 34.4 | 82 | 25 |
| J | Aged 1000 hr at 850° C. | 22 | IE-05 | 42.3 | 79.4 | 11.3 |

Manganese is an effective austenite stabilizer, like nickel, but is about one tenth the cost of nickel. The positive austenite stabilizing potential of manganese must be balanced with its possible affects on oxidation resistance at a given chromium level relative to nickel, which nears maximum effectiveness around 5 wt. % and therefore addition of manganese in excess of 10 wt. % is not recommended. Manganese in an amount of less than 2 wt. % may not provide the desired stabilizing effect. Manganese also dramatically increases the solubility of carbon and nitrogen in austenite. This effect is especially beneficial because dissolved nitrogen is an austenite stabilizer and also improves strength of the alloy when in solid solution without decreasing ductility or toughness. Manganese also improves strength ductility and toughness, and manganese and nitrogen have synergistic effects.

The dynamic reduction in the sulfur content to 0.1 wt. % or less proposed by the present alloys substantially eliminates the segregation of free sulfur to grain boundaries and further eliminates MnS particles found in conventional CF8C alloys, both of which are believed to be detrimental at high temperatures.

An appropriate niobium:carbon ratio reduces excessive and continuous networks of coarse niobium carbides (NbC) or finer chrome carbides (M23C6) along the grain or substructure boundaries (interdentritic boundaries and cast material) that are detrimental to the mechanical performance of the material at high temperatures. Accordingly, by providing an optimum level of the niobium and carbon ratio ranging from about 9 to about 11 for the modified CF8C alloys disclosed herein, niobium and carbon are present in amounts necessary to provide high-temperature strength (both in the matrix and at the grain boundaries), but without reducing ductility due to cracking along boundaries with continuous or nearly-continuous carbides.

Strength at all temperatures is also enhanced by the improved solubility of nitrogen, which is a function of manganese. For alloys of the modified CF8C type disclosed herein, the nitrogen content can range from 0.02 wt. % to about 0.5 wt. %. The presence of nitride precipitates is reduced by adjusting the levels and enhancing the solubility of nitrogen while lowering the chromium:nickel ratio.

In addition to the nitrogen levels disclosed above, the silicon content can be limited to about 3.0 wt. % or less, the molybdenum content can be limited to about 1.0 wt. % or less, the niobium content can range from 0.0 wt. % to about 1.5 wt. %, the carbon content can range from 0.05 wt. % to about 0.15 wt. %, the chromium content can range from about 18 wt. % to about 25 wt. %, the nickel content can range from about 8.0 wt. % to about 20.0 wt. %, the manganese content can range from about 0.5 wt. % to about 1.0 wt. %, the sulfur content can range from about 0 wt. % to about 0.1 wt. %, the niobium carbon ratio can range from about 8 to about 11, and the sum of the niobium and carbon contents can range from about 0.1 wt. % to about 0.5 wt. %.

Also, for the modified CF8C alloys disclosed herein, the phosphorous content can be limited to about 0.04 wt. % or less, the copper content can be limited to about 3.0 wt. % or less, the tungsten content can be limited to about 3.0 wt. % or less, the vanadium content can be limited to about 3.0 wt. % or less, the titanium content can be limited to about 0.20 wt. % or less, the cobalt content can be limited to about 5.0 wt. % or less, the aluminum content can be limited to about 3.0 wt. % or less and the boron content can be limited to about 0.01 wt. % or less.

Because nickel is an expensive component, stainless steel alloys made in accordance with the present invention are more economical if the nickel content is reduced.

INDUSTRIAL APPLICABILITY

The present invention is specifically directed toward a cast stainless steel alloy for the production of articles exposed to high temperatures and extreme thermal cycling such as air/exhaust-handling equipment for diesel and gasoline engines and gas-turbine engine components. However, the present invention is not limited to these applications as other applications will become apparent to those skilled in the art that require an austenitic stainless steel alloy for manufacturing reliable and durable high temperature cast components with any one or more of the following qualities: sufficient tensile and creep strength at temperatures in excess of 600° C.; adequate cyclic oxidation resistance at temperatures at or above 700° C.; sufficient room temperature ductility either as-cast or after exposure; sufficient long term stability of the original microstructure and sufficient longterm resistance to cracking during severe thermal cycling.

By employing the stainless steel alloys of the present invention, manufacturers can provide a more reliable and durable high temperature component. Engine and turbine manufacturers can increase power density by allowing engines and turbines to run at higher temperatures thereby providing possible increased fuel efficiency. Engine manufacturers may also reduce the weight of engines as a result of the increased power density by thinner section designs allowed by increased high temperature strength and oxidation and corrosion resistance compared to conventional high-silicon molybdenum ductile irons. Further, the stainless steel alloys of the present invention provide superior performance over other cast stainless steels for a comparable cost. Finally, stainless steel alloys disclosed herein will assist manufacturers in meeting emission regulations for diesel, turbine and gasoline engine applications.

While only certain embodiments have been set forth, alternative embodiments and various modifications will be apparent from the above description to those skilled in the art. These and other alternatives are considered equivalents and within the spirit and scope of the present invention.

What is claimed is:

1. A heat resistant and [cast,] corrosion resistant austenitic stainless steel alloy comprising:

from about 0.07 weight percent to about 0.15 weight percent carbon;

from about 18.0 weight percent to about 22.0 weight percent chromium and 11.0 weight percent to about 14.0 weight percent nickel;

from about 0.3 weight percent to about 1.5 weight percent niobium;

from 0.2 weight percent to about 0.5 weight percent nitrogen;

from about 2.0 weight percent to about 10 weight percent manganese;

less than about 0.03 weight percent sulfur;

0.45 weight percent molybdenum or less; and 0.75 weight percent silicon or less.

2. The stainless steel alloy of claim 1 wherein niobium and carbon are present in a weight ratio of niobium to carbon ranging from about 8 to about 11.

3. The stainless steel alloy of claim 1 further including less than about 0.04 weight percent phosphorous.

4. The stainless steel alloy of claim 1 further including about 3.0 weight percent copper or less.

5. The stainless steel alloy of claim 1 further including from about 0.2 weight percent titanium or less.

6. The stainless steel alloy of claim 1 further including from about 5.0 weight percent cobalt or less.

7. The stainless steel alloy of claim 1 further including from about 3.0 weight percent aluminum or less.

8. The stainless steel alloy of claim 1 further including from about 0.01 weight percent boron or less.

9. The stainless steel alloy of claim 1 further including from about 3.0 weight percent tungsten or less.

10. The stainless steel alloy of claim 1 further including about 3.0 weight percent vanadium or less.

11. The stainless steel alloy of claim 1 wherein nitrogen and carbon are present in a cumulative amount ranging from 0.1 weight percent to 0.65 weight percent.

12. An article formed from the heat resistant and [cast,] corrosion resistant austenitic stainless steel alloy of claim 1.

13. A heat resistant and [cast,] corrosion resistant austenitic stainless steel alloy comprising:

from about 18.0 weight percent to about 22.0 weight percent chromium and 11.0 weight percent to about 14.0 weight percent nickel;

from about 0.07 weight percent to about 0.15 weight percent carbon;

from 0.2 weight percent to about 0.5 weight percent nitrogen;

from about 2.0 weight percent to about 10.0 weight percent manganese;

from 0.65 weight percent to about 1.5 weight percent niobium and about 0.75 weight percent silicon or less.

14. The heat resistant and [cast,] corrosion resistant austenitic stainless steel alloy of claim 13 wherein the carbon content is from about 0.08 weight percent to about 0.12 weight percent carbon.

15. The heat resistant and [cast,] corrosion resistant austenitic stainless steel alloy of claim 13 wherein the manganese content is from about 2.0 weight percent to about 6.0 weight percent manganese.

16. The heat resistant and [cast,] corrosion resistant austenitic stainless steel alloy of claim 13 wherein the manganese content is from about 4.0 weight percent to about 6.0 weight percent manganese.

17. The heat resistant and [cast,] corrosion resistant austenitic stainless steel alloy of claim 13 wherein the niobium content is from about 0.65 weight percent to about 1.0 weight percent.

18. The heat resistant and [cast,] corrosion resistant austenitic stainless steel alloy of claim 13 wherein niobium and carbon are present in a weight ratio of niobium to carbon ranging from about 8 to about 11.

19. The heat resistant and [cast,] corrosion resistant austenitic stainless steel alloy of claim 13 further including sulfur in an amount of less than 0.1 weight percent.

20. The heat resistant and [cast,] corrosion resistant austenitic stainless steel alloy of claim 13 wherein the alloy is fully austenitic with any carbide formation being substantially niobium carbide.

21. The heat resistant and [cast,] corrosion resistant austenitic stainless steel alloy of claim 13 wherein the alloy is characterized as a CF8C steel alloy substantially free of manganese sulfides.

22. The heat resistant and [cast,] corrosion resistant austenitic stainless steel alloy of claim 13 wherein the alloy is characterized as a CF8C steel alloy substantially free of chrome carbides along grain and substructure boundaries.

* * * * *